(12) United States Patent
Tang

(10) Patent No.: US 12,099,528 B2
(45) Date of Patent: Sep. 24, 2024

(54) STORAGE STRUCTURE FOR DATA CONTAINING RELATIONAL OBJECTS AND METHODS FOR RETRIEVAL AND VISUALIZED DISPLAY

(71) Applicant: Servant (Xiamen) Information Technology Co., Ltd., Fujian (CN)

(72) Inventor: Zhengxiang Tang, Xiamen (CN)

(*) Notice: Subject to any disclaimer, the term of this patent is extended or adjusted under 35 U.S.C. 154(b) by 0 days.

(21) Appl. No.: 17/846,023

(22) Filed: Jun. 22, 2022

(65) Prior Publication Data

US 2022/0405307 A1    Dec. 22, 2022

(30) Foreign Application Priority Data

Jun. 22, 2021   (CN) .......................... 202110691486.8

(51) Int. Cl.
*G06F 16/28* (2019.01)
*G06F 16/242* (2019.01)
*G06F 16/2458* (2019.01)

(52) U.S. Cl.
CPC .......... *G06F 16/287* (2019.01); *G06F 16/244* (2019.01); *G06F 16/2477* (2019.01); *G06F 16/288* (2019.01)

(58) Field of Classification Search
CPC .. G06F 16/287; G06F 16/2477; G06F 16/244; G06F 16/288
See application file for complete search history.

(56) References Cited

U.S. PATENT DOCUMENTS

| | | | | |
|---|---|---|---|---|
| 5,970,490 A | * | 10/1999 | Morgenstern | G06F 16/258 |
| 7,246,128 B2 | * | 7/2007 | Jordahl | G06F 16/24578 707/999.102 |
| 7,246,728 B2 | * | 7/2007 | Nottingham | B44D 3/12 220/366.1 |
| 7,493,333 B2 | * | 2/2009 | Hill | G06F 16/358 707/999.102 |
| 7,620,664 B2 | * | 11/2009 | McGoveran | G06F 16/284 707/999.203 |
| 7,685,083 B2 | * | 3/2010 | Fairweather | G06F 8/427 706/45 |
| 8,051,102 B2 | * | 11/2011 | Everett | G06F 16/284 707/803 |
| 8,805,819 B1 | * | 8/2014 | Black | H04L 67/10 707/805 |
| 8,887,286 B2 | * | 11/2014 | Dupont | G06F 21/50 726/25 |

(Continued)

FOREIGN PATENT DOCUMENTS

| | | | |
|---|---|---|---|
| WO | WO2004/013770 | * | 2/2004 |
| WO | WO2004013770 A2 | * | 2/2004 |

*Primary Examiner* — Daniel A Kuddus

(57) ABSTRACT

A storage structure for data containing relational objects, as well as methods for retrieval and visualized display of data so stored are capable of recording relations among all objects in any scenario, as well as new relational states caused by changes and corresponding events happening in succession. The storage structure uses uniform formats to process information into logical and relational data, thereby contributing to subsequent characteristic analysis, supporting retrieval by objects and designated relational modes, and providing accurate display of information and its variations through versatile, visualized way.

9 Claims, 12 Drawing Sheets

| object type | object ID | resident group ID | starting time object ID | ending time object ID | serial number on timeline | numeral contents | unit ID | text contents | image contents |
|---|---|---|---|---|---|---|---|---|---|
| ordinary object | x | x | | | | | | | |
| event object | x | x | x | x | | | | | |
| time object | x | x | | | x | | | | |
| value object | x | x | | | | x | x | | |
| text object | x | x | | | | | | x | |
| image object | x | x | | | | | | | x |

(56) References Cited

U.S. PATENT DOCUMENTS

| | | | |
|---|---|---|---|
| 8,935,249 B2* | 1/2015 | Traub | G06F 16/3331 |
| | | | 707/777 |
| 11,449,477 B2* | 9/2022 | Piecko | G06F 16/2423 |
| 11,537,376 B2* | 12/2022 | Haener | G06N 10/20 |
| 2003/0187864 A1* | 10/2003 | McGoveran | G06F 16/284 |
| | | | 707/999.102 |
| 2007/0112714 A1* | 5/2007 | Fairweather | G06F 8/427 |
| | | | 706/46 |
| 2007/0239741 A1* | 10/2007 | Jordahl | G06F 16/24578 |
| 2020/0125559 A1* | 4/2020 | Talbot | G06F 16/2456 |
| 2020/0175043 A1* | 6/2020 | Hughes | G06F 16/24573 |

* cited by examiner

| object type | object ID | resident group ID | starting time object ID | ending time object ID | serial number on timeline | numeral contents | unit ID | text contents | image contents |
|---|---|---|---|---|---|---|---|---|---|
| ordinary object | x | x | | | | | | | |
| event object | x | x | x | x | | | | | |
| time object | x | x | | | x | | | | |
| value object | x | x | | | | x | x | | |
| text object | x | x | | | | | | x | |
| image object | x | x | | | | | | | x |

FIG. 2

| relational mode ID | group 1 ID | group 2 ID | text object ID of title given to group 2 object by group 1 object | text object ID of title given to group 1 object by group 2 object | superior relational Mode ID | relation type |
|---|---|---|---|---|---|---|
| - | a | b | - | - |  | ordinary |
| - | a | b | - | - |  | type |
| - | a | a | - | - |  | intra-group |
| - | a | a | - | - |  | superior-subordinate |

FIG. 4

| relational state ID | relational mode ID | object 1 ID | object 2 ID | initialing event object ID | ending event object ID |
|---|---|---|---|---|---|
| 1 | - | A | B | | |
| 2 | - | X | Y | | |
| 3 | - | Y | Z | | |
| 4 | - | Z | X | | |

FIG. 6

| internal relation ID | relational state 1 ID | relational state 2 ID | relational state 3 ID |
|---|---|---|---|
| - | 2 | 3 | 4 |

FIG. 7

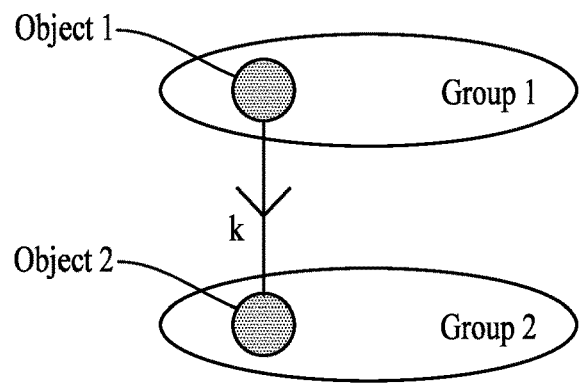
FIG. 8-1
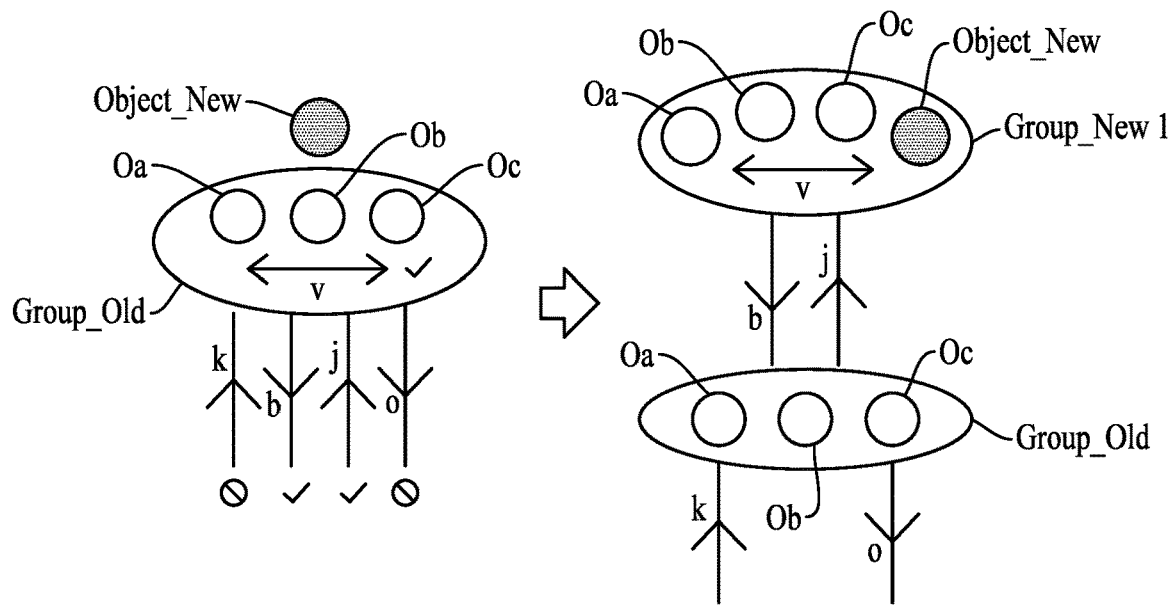
FIG. 8-2
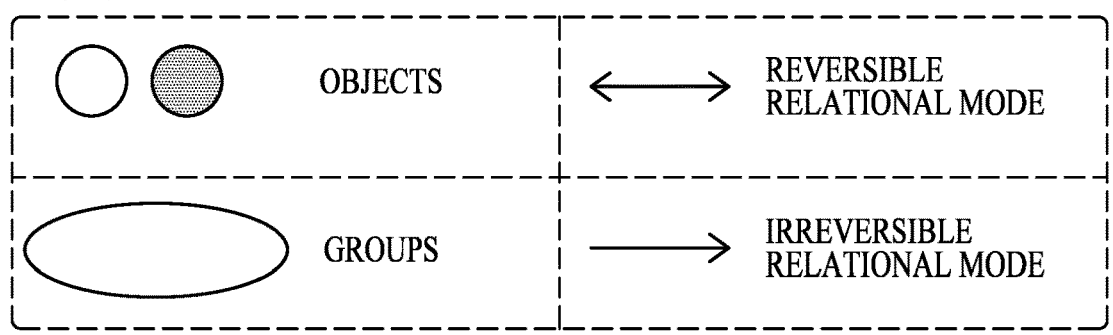

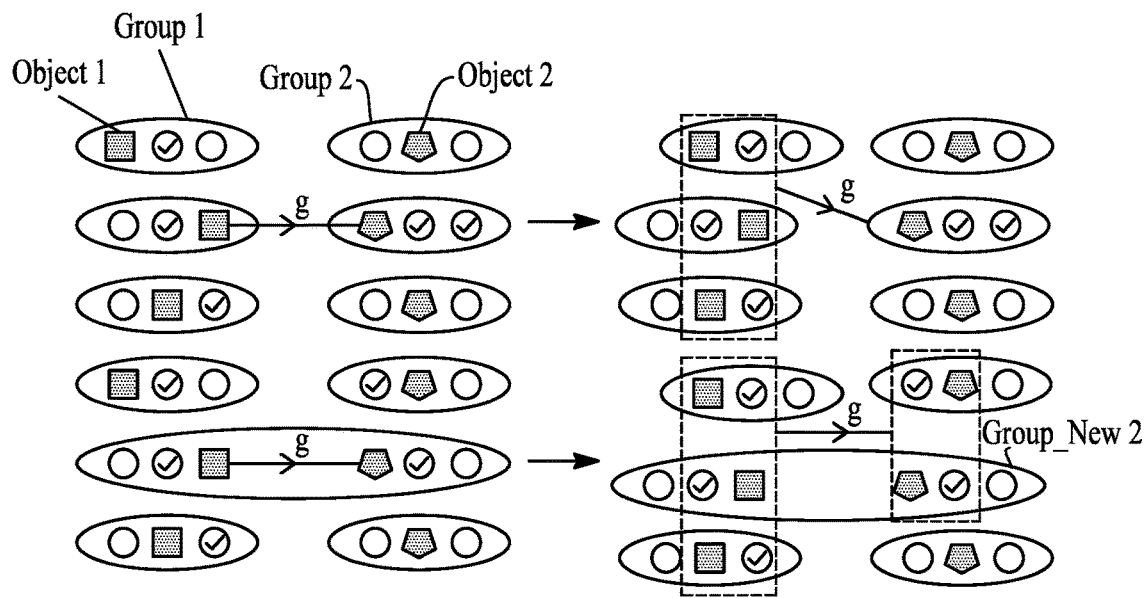
FIG. 8-3
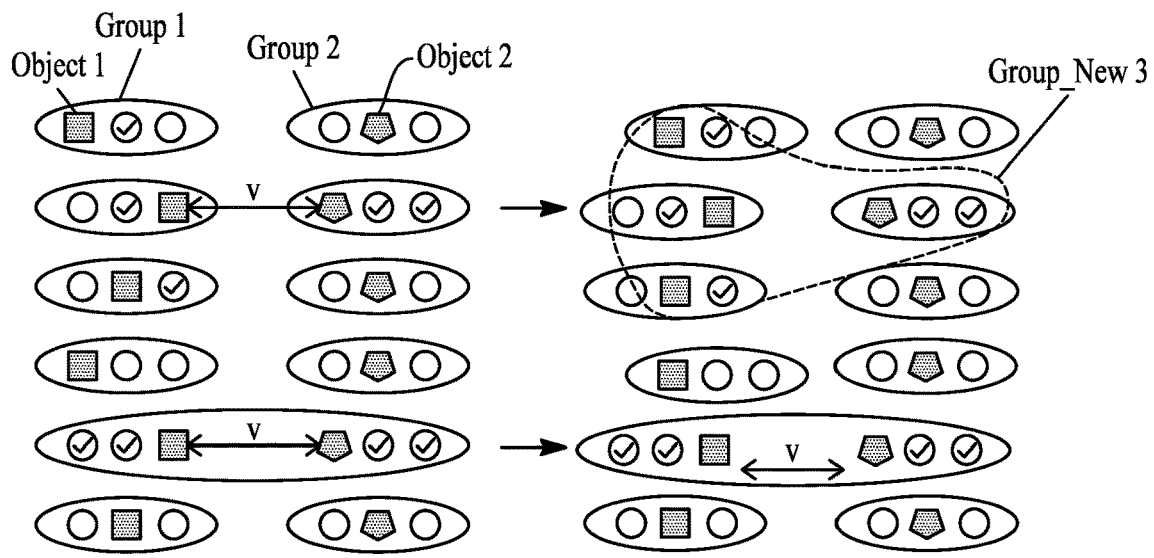
FIG. 8-4
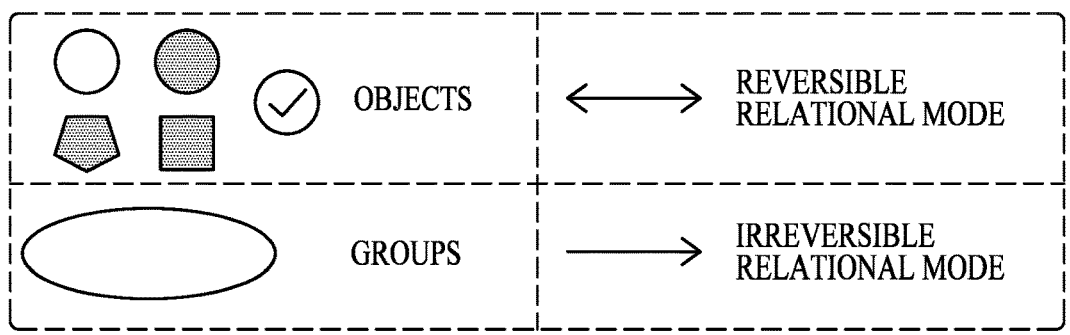

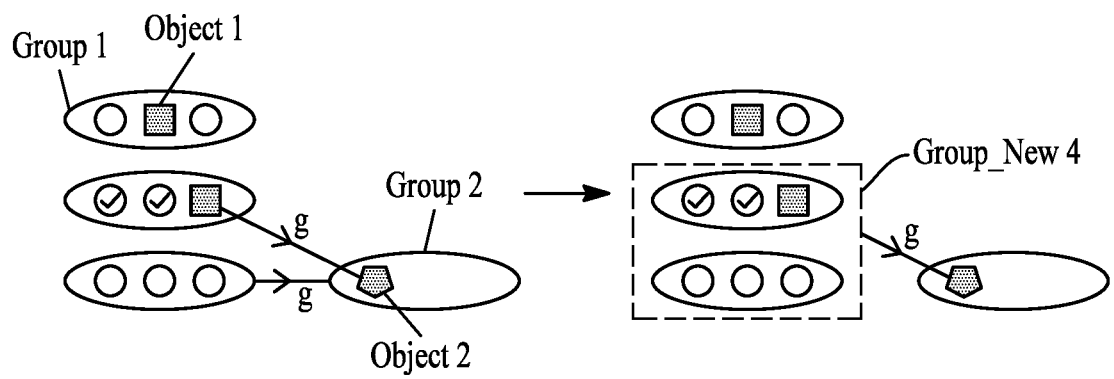
FIG. 8-5
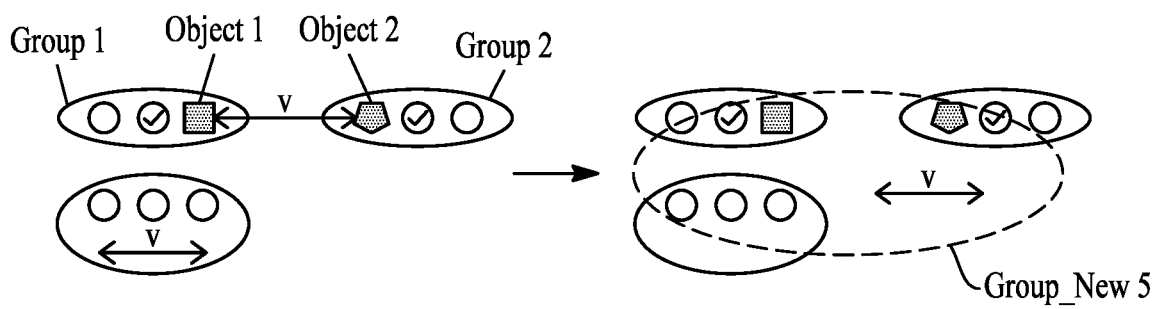
FIG. 8-6
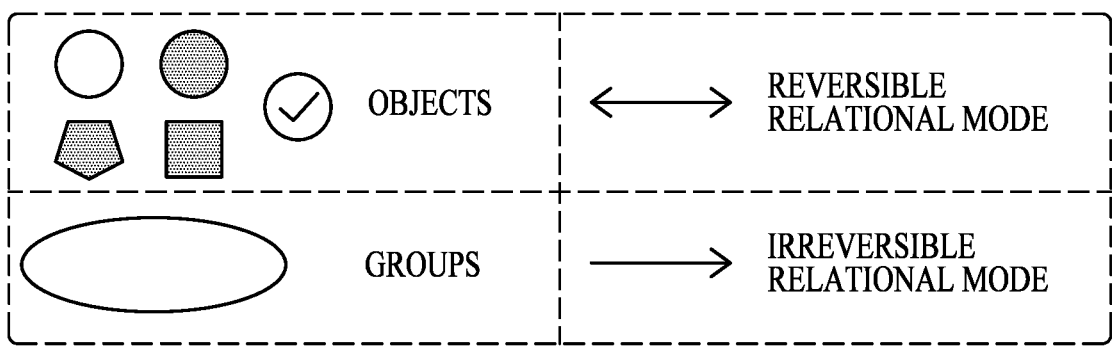

STORAGE STRUCTURE FOR DATA CONTAINING RELATIONAL OBJECTS AND METHODS FOR RETRIEVAL AND VISUALIZED DISPLAY

BACKGROUND OF THE INVENTION

1. Technical Field

The present invention relates to data processing, and more particularly to a storage structure for data containing relational objects as well as methods for retrieval and visualized display of data so stored.

2. Description of Related Art

With the development of the Internet and technology, information is showing exponential growth. As a result, the volume of information about things existing in the real world or in the imaginary world becomes increasingly huge. Currently, the most common way to compile such information is to transform it into encyclopedia lexical entries or introductive articles. However, data assembled in this manner are usually not in uniform and solid formats, making them difficult to analyze and retrieve, and visualization thereof is monotonous. Due to these disadvantages, the existing lexical entries tend to have undiscovered logical defects and lack for data integrity. According to the traditional data processing concept, every object has only one independent lexical entry, and it is desirable to have a scheme that turn chaotic information into logical data that can be easily analyze, retrieved, and visualized.

SUMMARY OF THE INVENTION

The objective of the present invention is to provide a storage structure for data containing relational objects, as well as methods for retrieval and visualized display of data so stored, which process lexical entries into logical and relational data, and provide efficient storage means that allows effective retrieval by objects and designated relational modes, and accurately display information and its variations through versatile, visualized way that support good user experience.

According to the present invention, the storage structure for data containing relational objects comprises a Class A unit for storing objects to be processed, a Class B unit for storing possible relational modes of the objects, a Class C unit for storing specific relational states, and an auxiliary unit:

the Class A unit, for storing plural said objects to be processed, in which the objects that have similar available said relational modes are classified into one group, the objects including ordinary objects and a plurality of types of special objects, each said object in the Class A unit recording a unique ID of this object and a resident group of this object, and each said special object further recording relevant data required by this special object;

the Class B unit, for storing the relational modes possibly existing between all of the objects in the Class A unit, each said object having an attribute formed from the relational mode between itself and another said object, in which adding one said relational mode endows the objects in Group 1 and the objects in Group 2 each with one said attribute, respectively, and all of the objects in the same group share this attribute, the Class B unit recording the relation mode between every two said groups, every said relational mode recording a relational mode ID, Group 1, Group 2, a text object corresponding to a title with which the objects in Group 1 call the objects in Group 2 under this relational mode, a text object corresponding to a title with which the objects in Group 2 call the objects in Group 1 under this relational mode, a superior relational mode superior to this relational mode, and a type to which this relational mode belongs;

the Class C unit, for storing the actual relational states between particular said objects, the Class C unit recording the relational state between every two said objects, every said relational state recording a relational state ID, the relational mode between Object 1 and Object 2, Object 1, Object 2, and an event object of an initiating event as well as an event object of an ending event, in which the initiating and ending event objects determine an interval of existence of this relational state along timelines corresponding to these event objects;

the auxiliary unit, as an additional unit, being configured to ensure data integrity in the Type A, B, and C units, and storing information of internal relations;

the special objects including:

the event objects: classified into a plurality of groups, in which the event objects that have similar available said relational modes are classified into the same group, data corresponding to each said event object including: an object ID, a resident group, a starting time, and optionally an ending time;

in the Class B unit, the types of the relational modes including:

A. ordinary relations: referring to general, irreversible relations, and referring to the relational modes of the groups in which the objects in Group 1 and the objects in Group 2 are stored;

B. infra-group relations: being reversible relations, and referring to relations between the objects in the same group, wherein the groups in which the objects in Group 1 and the objects in Group 2 are stored are identical; and C. superior-subordinate relations: being special, reversible relations, in which the groups in which the objects in Group 1 and the objects in Group 2 are stored are identical, and the objects in the same group form including and included relations.

The internal relation information refers to the relational states involved by records of the internal relations when one said relational state involves three or more said objects, the internal relation records, in which when one said relational state involves three objects, one said internal relation is required to record the three relational states therein, and when one said relational state involves n objects $$\frac{(n-1)(n-2)}{2}$$

said internal relations are required to record the $$\frac{(n-1)n}{2}$$

relational states therein.

According to the present invention, a method for constructing a visualized retrieval interface based on the storage structure for data containing relational objects comprises the following steps:

(1) providing the retrieval interface with a plurality of group display frames arranged vertically from top to bottom for receiving inputs of retrieval criteria and for displaying retrieval results, wherein a link existing between every two said group display frames represents a designated said relational mode, a higher said group display frame having some said objects selected to form the retrieval criteria, and a said lower group display frame displaying the retrieval results, wherein a time span limit bar is used as one of the retrieval criteria for defining a time interval and forms, together with every said retrieval criterion, an "and" relation to limit and filter the retrieval results;

in which if none of the group display frames has any said object selected, the group display frame at the top is a result level at default for showing the retrieval results, while all the other group display frames below are reserved levels with the objects therein inoperable; and when one or more said objects in the result level are selected, the result level is turned to a filter criterion level, and the group display frame immediately below it acts as a new result level, and so on;

in which the objects selected in the filter criterion level is subject to change anytime, and after the change the group display flame immediately below it acts as a new result level; and if after the change none of the objects in the group display frame is selected, this group display frame becomes a new result level, and all the other group display frames below the result level are reserved levels with the objects therein inoperable; and (2) configuring the retrieval interface so that the group display frame at every said level in the retrieval interface represents a particular said group, and includes the objects whose resident groups include the represented groups, in which upon creation of each said group display flame, a determination is made about which said group it represents according to the relational modes connected to it, and the objects in the group display flame displays required information in a custom manner.

At first accessing to the initial retrieval interface, providing the initial retrieval interface with plural said group display frames at plural said levels and the relational modes therebetween, or designating at least one said group display frame as an initial level;

clicking an edit button provided in a said group display flame at a said level to replace the group represented by the group display frame at the level by navigating all said groups having the objects in the group display frame at the level through the Class A unit, and selecting one said group that has not been represented by any previous said group display frame, or deselecting a said group that has not been represented by a said group display frame at a said level, wherein the groups used by the relational modes that have been linked cannot be deselected;

clicking one said group that has been represented by the group display frame at the level, searching through the Class B unit and displaying all the relational modes of the group, and selecting one of the relational modes to generate a group display frame; and after the corresponding display frame is generated, if the selected group display frame already has a said group display frame below it, topping the selected group display frame at the level with a corresponding group display frame, and using this relational mode to form a said link; or, otherwise, generating, below the group display frame at the selected level, a group display frame that represents this relation as the corresponding group, and using this relational mode to form a said link; and adding one said link between the group display frames, by selecting two said group display frames needing to be linked, checking the relational modes between the groups represented by the two group display flames, selecting one of the relational modes, and linking the two group display frames using this relational mode.

The group display frames at the plural levels can exchange their locations across the levels, and the individual group display frames are deletable, in which deletion of one said group display frame causes deletion of the link connected thereto.

According to the present invention, a method for implementing retrieval based on a retrieval interface built using the foregoing method for constructing a visualized retrieval interface comprises: selecting the objects of the group display frame at the filter criterion level in the retrieval interface, or entering text contents into a text search field, and dragging a time span limit bar to set a starting time point and a terminating time point, thereby jointly forming the retrieval criteria, so that the retrieval results obtained using the retrieval criteria are resident in the result level.

The method further comprises the following steps:
(1) during retrieval performed through the group display frames, from all the selectable filter criteria displayed in the topmost group display frame, selecting one or more said objects, so that the objects having the relational modes with the selected objects through the links as filtered out through the Class C unit are displayed in the group display frame that is below and linked to the topmost group display frame, wherein multiple said levels of one said group display frame are connected by "and" relations, and for a said filter criterion level for which multiple said objects are selected, these objects selectively form the "and" or "or" relations when used to filter another said group display frame, when a said reserved level is used as a said filter criterion level for filtering, allowing the objects in the group display frame which it is upward linked to and is not a said filter criterion level to get filtered by this reserved level, in which the filter criteria are equivalent to that all of the objects in the reserved level are selected and from the "or" relations, and if then any said filtered group display frame still has any upward linked said group display frame, repeating this operation, and so on; and
(2) filtering the objects of the result level using the time span limit bar down at the retrieval interface, wherein the time span limit bar includes the starting times of all the event object related to the objects in the result level each along a timeline, so that after one said timeline represented by the time span limit bar is selected flow the timelines corresponding to all the event objects, a time object having the earliest starting time of these events along this timeline acts as an earliest time point of the span bar, at the latest time acts as a latest time point of the span bar, between which two points there is a starting point and an ending point that are both movable; and
wherein the links connecting to the result level are the relational states used when the objects in the result level are filtered, and wherein when there are an initiating event and an ending event in the Class C unit, and initiating and ending times of the events are on the timeline of this time span limit bar, any said relational state in which the initiating time point of the initiating event is after the terminating time point of the time span limit bar, or the initiating time point of the ending event is before the starting time point of the time span limit bar is not processed during filtering; and only the relational states in which the initiating time point of the ending event is before the terminating time point of the time span limit bar are processed.

If the special objects in the Class A unit include:

text objects: forming only one said group, and data corresponding to each said text object including: an object ID, one and only one resident group, and text contents;

retrieval can be conducted using the text contents by inputting the text contents to the text search field, so that the text contents become new filter criteria for the filter criterion level and the result level to filter the objects already existing therein, thereby filtering out the object that has the relational state with the text object in the Class C unit in which the related text object contains the text contents in the text search field.

If the special objects in the Class A unit include:

time objects: forming plural said groups, in which the time objects of the same timeline are classified into the same group, and data corresponding to each said time object including: an object ID, one and only one resident group, and a serial number used for sorting along this timeline;

value objects: forming plural said groups, in which the value objects of the same measurement are classified into the same group, and data corresponding to each said value object including: an object ID, one and only one resident group, numeral contents, and a unit;

for each said group display frame including the value/time objects, a display mode thereof is changed to a value span limit bar/the time span limit bar, in which among the objects included in the group display frame, the value-maximum/time-latest object is used as the maximum-value/latest-time point of the limit bar, and the value-maximum/time-latest object is used as the maximum-value/latest-time point of the limit bar; and when used as the filter criteria, between the two points there is a starting point and an ending point that are both movable, in which an "or" relation is formed among the objects between the starting point and the ending point for filter other said levels linked download.

According to the present invention, a method for visualized display of retrieval results obtained using the foregoing method for implementing retrieval based on retrieval interface comprises: dynamically displaying the objects in the result level through at least one display interface in a visualized manner, in which if the objects in the result level are suitable to be displayed through plural said display interfaces, they can be switched among the suitable display interfaces.

The method further comprises: providing a display interface for displaying said events, which is only used when the objects in the result level are said event objects, or when the objects in the result level have the time attribute in the Class B unit, and have the relational state of this time attribute in the Class C unit, and makes display in a form of an x-y-axis pair, wherein a y axis is a timeline of these events, or a timeline along which this time attribute exists, and they axis has a height determined by the earliest time point and the latest time point in the times corresponding to the time attribute designated for the times/objects along this timeline corresponding to the objects in the result level; the display interface generating blocks representing these objects according to the objects related to the attribute designated for the objects in the result level, wherein for sufficiently sizing each said block that it can carry the corresponding objects in the result level, the block has an event display area whose height in they axis is determined by the earliest time point and the latest time point in the times corresponding to the time attribute designated for the times/objects along this timeline corresponding to the events in the result level corresponding to this block, and whose width in an x axis is determined by a maximum number of the events happening simultaneously, such that different said blocks have their respective said areas not overlapping each other; when the objects represented by the blocks have superior-subordinate relational modes therebetween, and have relational states of the superior-subordinate relational modes, such displaying the blocks that a said block representing a superior wraps and is displayed below a said block representing a subordinate; for each said object in the result level, determining a location thereof in the y axis according to the corresponding time object in a y-axis timeline, and determining in which said block it is resident according to the object corresponding to the block, if a said object in the result level has plural corresponding said time objects or blocks, allowing this object in the result level to be displayed repeatedly; linking the objects in the result level from top to bottom according to a said attribute of the objects in the result level, and linking two said superior and subordinate events in this attribute that are related to the same object.

With the technical schemes of the present invention, information in a lexical entry can be transformed into relations between this object and other objects, and data about how these relations change, making it possible to record how all objects (i.e., any conception or thing that traditionally can be written into a lexical entry) relate to each other in any scenario. For scenarios where events happen over time, in addition to information of events, new relational states caused by changes and corresponding events happening in succession can be recorded as well. The approach to storage, as disclosed in the present invention, can then keep the recorded information as logical and relational data in uniform formats, thereby contributing to subsequent characteristic analysis, supporting retrieval by objects and designated relational modes, and providing accurate display of information and its variations through versatile, visualized way.

BRIEF DESCRIPTION OF THE DRAWINGS

FIG. 2 is a schematic illustration showing contents stored in the Class A unit according to the present invention;

FIG. 4 is a schematic illustration showing contents stored in the Class B unit according to the present invention;

FIG. 6 is a schematic illustration showing contents stored in the Class C unit according to the present invention;

FIG. 7 is a schematic illustration showing contents stored in an auxiliary unit according to the present invention;

FIG. 8-1 is a schematic illustration showing a process of storage according to the present invention;

FIG. 8-2 is a schematic illustration showing a first storage mode according to the present invention;

FIG. 8-3 is a schematic illustration showing a second storage mode according to the present invention;

FIG. 8-4 is a schematic illustration showing a third storage mode according to the present invention;

FIG. 8-5 is a schematic illustration showing a fourth storage mode according to the present invention;

FIG. 8-6 is a schematic illustration showing a fifth storage mode according to the present invention;

The invention will be will be best understood by reference to the following detailed description of illustrative embodiments when read in conjunction with the accompanying drawings.

DETAILED DESCRIPTION OF THE INVENTION

The present invention provides a storage structure for data containing relational objects, which comprises a Class A unit for storing objects to be processed, a Class B unit for storing possible relational modes of the objects, a Class C unit for storing specific relational states, and an auxiliary unit, which will be detailed below.

Figure 1:
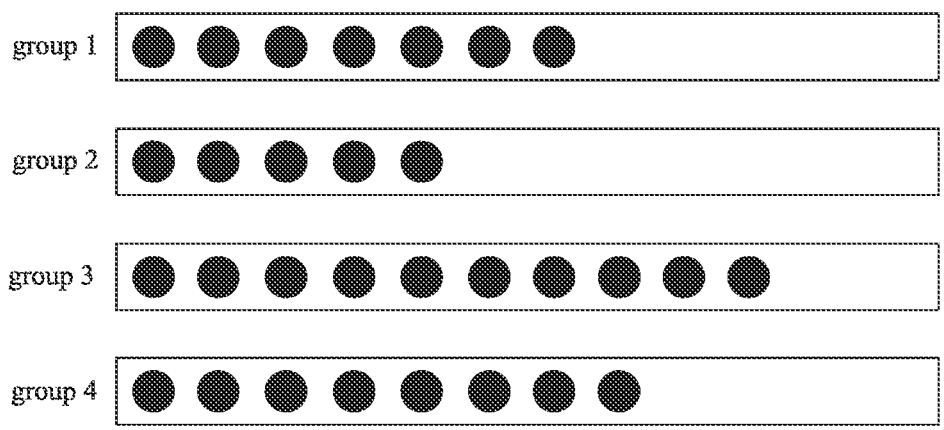
FIG. 1 is a logical diagram illustrating construction contents of a Class A unit according to the present invention.

(1) Class A unit: it is for storing objects to be processed, as shown in FIG. 1, in which the objects that have similar available said relational modes am classified into one group. The objects include ordinary objects and a plurality of types of special objects. Each said objects in the Class A unit at least records the unique ID of the object and the resident group. If the object is in a special-object group, this object is a special object. Each of the special objects further records data required by this special object, as shown in FIG. 2. Objects can be classified into the following types:

Ordinary objects: forming plural groups, in which the ordinary objects having similar relational modes are classified into the same group, the corresponding data of every ordinary object including: its object ID, and at least one, viz., one or more, resident group;

Event objects: classified into a plurality of groups, in which the event objects having similar said relational modes are classified into the same group, the corresponding data of every event object including: its object ID, the resident group, the time object representing the starting time, and optionally the time object representing the ending time;

Time objects (such as dates and time points): forming plural said groups, in which the time objects of the same timeline are classified into the same group, the corresponding data of every time object including: its object ID, the one and only one resident group, and a serial number used for sorting along this timeline;

Value objects: forming plural said groups, in which the value objects of the same measurement are classified into the same group, the corresponding data of every value object including: its object ID, the one and only one resident group, numeral contents, and the unit (for example, in a value object "1m," the data contents including: its object ID; the name of its group, "length;" the numeral contents, "1" and the unit, "m");

Text objects (such as names, tides, and descriptions): having only one group, the corresponding data of every text object including: its object ID, the one and only one resident group, and text contents; and Image objects (such as avatars, logos, and cons): having only one group, the corresponding data of every image object including: its object ID, the one and only one resident group, and image contents.

The Class A unit may be in the form of a single table, or a set of tables by groups that share a common auxiliary table, or any structural form compatible with the storage structure of the database in use. Each of the objects in the Class A unit records the resident groups.

Figure 3:
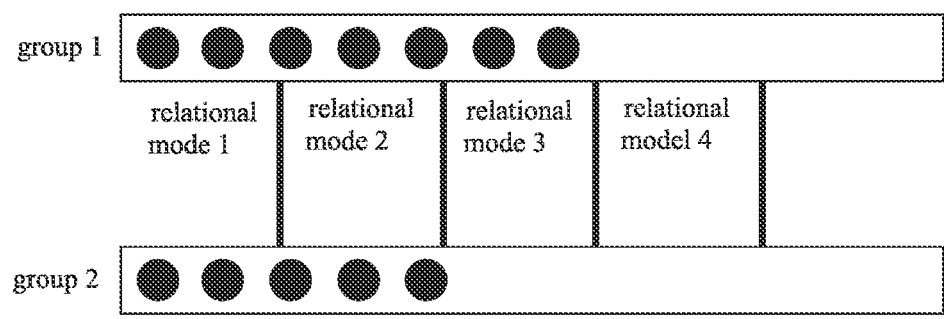
FIG. 3 is a logical diagram illustrating construction contents of a Class B unit according to the present invention.

(2) Class B unit: it is for storing all relational modes possibly existing between the objects in the Class A unit (see FIG. 3). Each of these objects has an attribute formed flow the relational mode between itself and another object. Adding one said relational mode endows the objects in Group 1 and the objects in Group 2 each with one said attribute, respectively, and all the objects in the same group share this attribute. The Class B unit records the relation mode between every two groups. Every relational mode records its relational mode ID, Group 1, Group 2, a text object corresponding to a title with which the objects in Group 1 call the objects in Group 2 under this relational mode (i.e. an attribute name assigned to the Group 1 object by this relational mode), a text object corresponding to a title with which the objects in Group 2 call the objects in Group 1 under this relational mode (i.e. an attribute name assigned to the Group 2 object by this relational mode), a superior relational mode superior to this relational mode (optional), and a type to which this relational mode belongs. As shown in FIG. 4, saying that Group 1 is "performance," the attribute to be added is "participating role," Group 2 is "role," and the attribute to be added is "performance performed," an entry of data is to be added for the relational mode. The data contents include: the relation ID, Group 1, Group 2, the text object corresponding to the title of the Group 2 object given by the Group 1 object in this relational mode, namely "participating role", and the text object corresponding to the title of the Group 1 object given by the Group 2 object in this relational mode, namely "performance performed." Since there is no superior relational mode in this case, the fields for the superior relational mode are left void. The type of the relational mode is ordinary relations.

The Class B unit stores the following types of relational modes.

A. Ordinary relations (general irreversible relations): these are relations without special criteria (such as a person performs in a performance as a performer, an article is owned by a role; a role has a name; etc.) These are relational modes between groups stored by Group 1 objects and Group 2 objects.

B. Type relations (special irreversible relations): Group 1 objects act as the classification criteria of Group 2 objects (for example, the attribute of Group 1 is the gender or race and is used as the classification criterion based on which the attribute of Group 2 classifies people; or the attribute of Group 1 is the type of story and is used as the classification criterion based on which the attribute of Group 2 classifies performances). When a Group 1 object is used to refer to Group 2 objects, the Group 1 object is the collection of Group 2 objects. For example, for the statement "someone is a student by occupation," the Group 2 object "student" may refer to the Group 1 object, "someone," so the relational mode, "occupation," is a type relation. In another example, for the statement "someone owns a pencil," the Group 2 object, "pencil," cannot represent the Group 1 object, "student," so the relational mode, "owns," is an ordinary relation. For one object, every classification criterion is regarded as a separate relational mode.

C. Intra-group relations (reversible relations): These are relations between objects in the same group. Group 1 objects and Group 2 objects store the same groups, which means that in this relational mode, the contents in Group 1 and the contents in Group 2 are the same.

D. Superior-subordinate relations (special reversible relations): Group 1 objects and Group 2 objects store the same groups and the objects in the same group form including and included relations.

(3) Class C unit: It is used to store actual relational states between particular objects (see FIG. 5). The Class C unit records the relational state between every two objects. Evert entry of data records the relational state ID, the relational mode between Object 1 and Object 2, Object 1, Object 2, and an event object of an initiating event as well as an event object of an ending event. The initiating and ending event objects determine an interval of existence of this relational state along timelines corresponding to these event objects. As shown in FIG. 6, the first entry of data expresses the relational state 1 between Object A and Object B, while the second through fourth entries record the relational states between each two of the objects X, Y, and Z, respectively.

(4) Auxiliary unit: This is an additional unit is for ensuring the data integrity in the Type A, B, and C units, and stores internal relation information, including:

Group name tables: recording group IDs, the corresponding text objects, group types, in which these data of groups may be directly stored in the Class C unit, in which case there is no need to have a group name table; and Internal relation information: for a relational state involving three or more objects, recording involved relational states, in which if a relational state involves three objects, an internal relation is required to record the three relational states therein. As shown in FIG. 7, the relational states between each two of the objects X, Y, and Z are recorded. The corresponding internal state IDs, include data records in the Class C unit having their relational states ID number as 2, 3, and 4. When a relational state involves 4 objects, data of two additional internal relations are required. When an internal relation involves 4 objects, 6 relational states have to be recorded, and 6 relational states need information of three internal relations. When a relational state involves n objects, $$\frac{(n-1)(n-2)}{2}$$

internal relations are required to record the $$\frac{(n-1)n}{2}$$

relational states.

The present invention implements data storage based on the storage stricture for data containing relational objects as described above. The method of data storage comprises the following steps:

Step 1. Constructing a storage structure as described previously, which comprises a Class A unit for storing objects to be processed, a Class B unit for storing possible relational modes of the objects, a Class C unit for storing specific relational states, and an auxiliary unit; and Step 2. With the storage structure constructed in Step 1, recording the relational states between each two objects to be processed, thereby accomplishing storage of contents in the Class A, B and C units. Details will be discussed below.

(1) When data are void, the process begins with two objects having an irreversible relation therebetween. As shown in FIG. 8-1, a first object Object 1 is added to the Class A unit, and a first group Group 1 is created for accommodating the first object Object 1. Then a second object Object 2 is added to the Class A unit, and a second group Group 2 is limited for accommodating the second object Object 2. Their irreversible relation k is added to the Class B unit. The relational states of each two objects Object 1 and Object 2 are added into the Class C unit. The data are afterward expanded by entering other relational states that are to be processed.

(2) New data are entered. First, a relational state is added to the Class C unit, and the initiating event and the ending event of this relational state are determined. If there is the initiating event or the ending event, and the corresponding event object is not in the Class A unit now, this event object has to be entered first, and the event object is confirmed according to the relational state between this event object and existing Object 1 or Object 2. Then the resident groups Group 1 and Group 2 of Object 1 and Object 2, respectively, are acquired through the Class A unit. If any of the object is an unknown object not in the Class A unit and is a special object other than an event object, the group is determined according to the attribute of this special object. When any special object other than an event object uses a new relation, it means that all objects in this group can use this relation. When at the processing step (4) there is a need to add a new resident group (J) for a special object (a1) other than an event object, the relational mode triggering the mechanism will be reproduced, and the reproduced in-relational- mode group (J) is replaced by the resident group of the object (a1).

(3) If any of the objects (a2) is an unknown object not in the Class A unit, this object is added into the Class A unit. This object is then compared to all groups to determine whether this object can have all relational modes of this group in the Class B unit. In this process, if any group is found as satisfying the criteria, this group is added into the resident group of this object. If a group (P) is found to be a partially satisfying one, a new group (Q) is created. The group (Q) is added to the resident groups of all objects in the group (P) and the object (a2). For every relational mode of object (a2) in the Class B unit that satisfies the criteria, the group (P) is replaced by the group (Q). After all groups are compared, if it is determined that there is not any group satisfies the criteria, a new group is created and added into the resident group of the object (a2). An example is now described to explain how to determine whether a new object Object New is in a group. As shown in FIG. 8-2 , this group contains three objects Oa, Ob, Oc, one reversible relational mode v, and four irreversible relational modes k, b, j, o. This new object Object New can use the relational modes v, b, j, and is not allowed to use the irreversible relational modes k and o. Then a new resident group Group New is added as a resident groups of the three objects Oa, Ob, Oc, and the new object Object New, and the old group Group Old in the relational modes v, b, j are replaced with the new group Group New 1, while the irreversible relational modes k and o remain unchanged.

(4) Then the resident groups of Object 1 and Object 2 are determined. The type of the relational modes in the Class B unit is first determined. Determination is subsequently made to the data under Group 1 and Group 2. Afterward, another relational mode as that of the data under Group 1 and Group 2 can be used as the superior or the subordinate of this relational mode.

(4.1) As shown in FIG. 8-3, if it is an unknown irreversible relational mode (g), it is added to the Class B unit. The type of the relation is determined, and it is determined whether the objects of all resident groups of Object 1/Object 2 can have this relational mode with the objects under Group 1/Group 2. If all objects satisfying criteria are all objects in a group, this group is used as the data under Group 1/Group 2 in the Class B unit. Otherwise, A newly created group Group New 2 is added to the resident groups of all objects that satisfy the criteria, and the newly created group Group New 2 is used as the data under Group 1/Group 2 in the Class B unit.

(4.2) If it is an unknown reversible relational mode (v) in the Class B unit, as shown in FIG. 8-4, this relational mode y is added to the Class B unit. Then it is determined whether the objects on all resident groups of Object 1 and Object 2 can use this relational mode with the objects under Group 1 and Group 2. If all objects satisfying the criteria are all objects of a group, this group is used as the data under Group 1 and Group 2 in the Class B unit. Otherwise, a newly created group Group New 3 is added to the resident groups of all objects satisfying the criteria, and the newly created group Group New 3 in the Class B unit is used as the data under Group 1 and Group 2.

Figure 5:
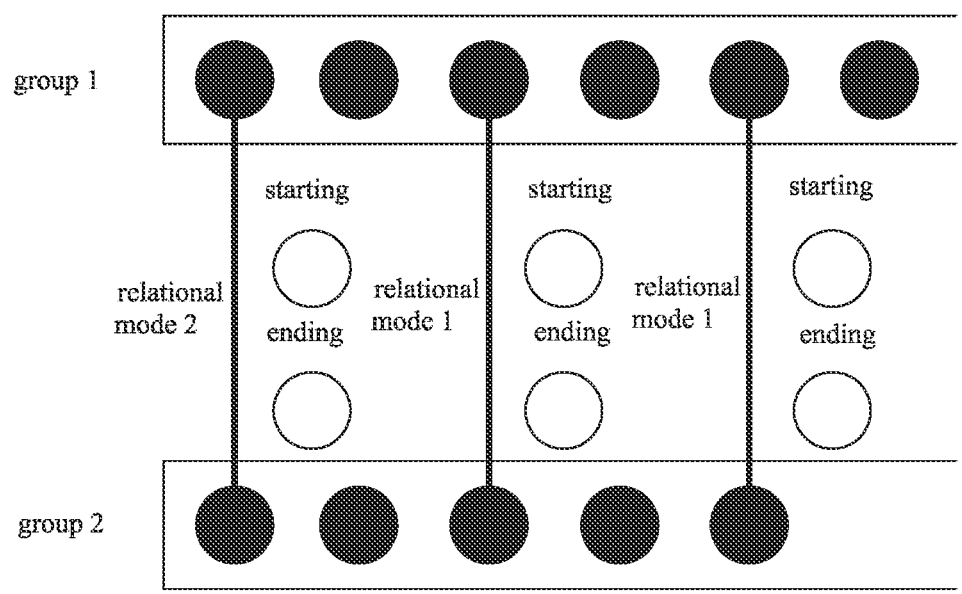
FIG. 5 is a logical diagram illustrating construction contents of a Class C unit according to the present invention.

(4.3) If it is the known irreversible relational mode (g), as shown in FIGS. 8-5 , and the resident groups of Object 1 and Object 2 are coincident with the data of this relation g under Group 1 and Group 2 in the Class B unit, it indicates that the data is integral and there is no need for special processing. If the data do not match, it is then determined whether all objects wider the resident group of Object 1/Object 2 unmatched can use this relational mode with the objects under Group 1/Group 2. A newly created group Group New 4 is added into the resident groups of all objects satisfying the criteria and all objects in the corresponding groups under Group 1/Group 2. The newly created group Group New 4 is now used as new Group 1/Group 2 of this relational mode.

(4.4) If it is a known reversible relational mode (v), as shown in FIGS. 8-6, and the resident groups of Object 1 and Object 2 match the data of this relational mode under Group 1 and Group 2 in the Class B unit, it indicates that the data is integral and there is no need for special processing. If the data do not match, it is then determined whether all objects under the resident groups of Object 1/Object 2 unmatched can use this relational mode with the objects under Group 1 and Group 2. A newly created group Group New 5 is added into the resident groups of all objects satisfying the criteria and all objects in the corresponding groups under Group 1/Group 2. The newly created group Group New 5 is now used as new Group 1/Group 2 of this relational mode.

(5) After the relational modes between Object 1 and Object 2 of the new data in the Class A unit and the new data in the Class B unit are fully identified, these data are entered into the relational states newly added to the Class C unit.

(6) When a relational state has three and more objects, the relational states between every two objects have to be identified separately. Then these relational states are joined through addition of internal relational modes.

When a relational state involves a third object, the relational states between the third object and each of the two original objects have to be identified separately. Then the three relational states are joined through addition of internal relational modes.

If this relational state involves a fourth object, the relational states between the fourth object and each of the three original objects have to be identified separately. Then the six relational states are joined through addition of internal relational modes.

It is thus clear that, when a relational state involving m objects now involves (m+1) objects, m relational modes have to be identified and (m−1) internal relations have to be added.

The internal relation is an assembly of the three relational states. After all the relational states needing to be joined are identified separately, the data are integral without the need of other special processing works.

Figure 9:
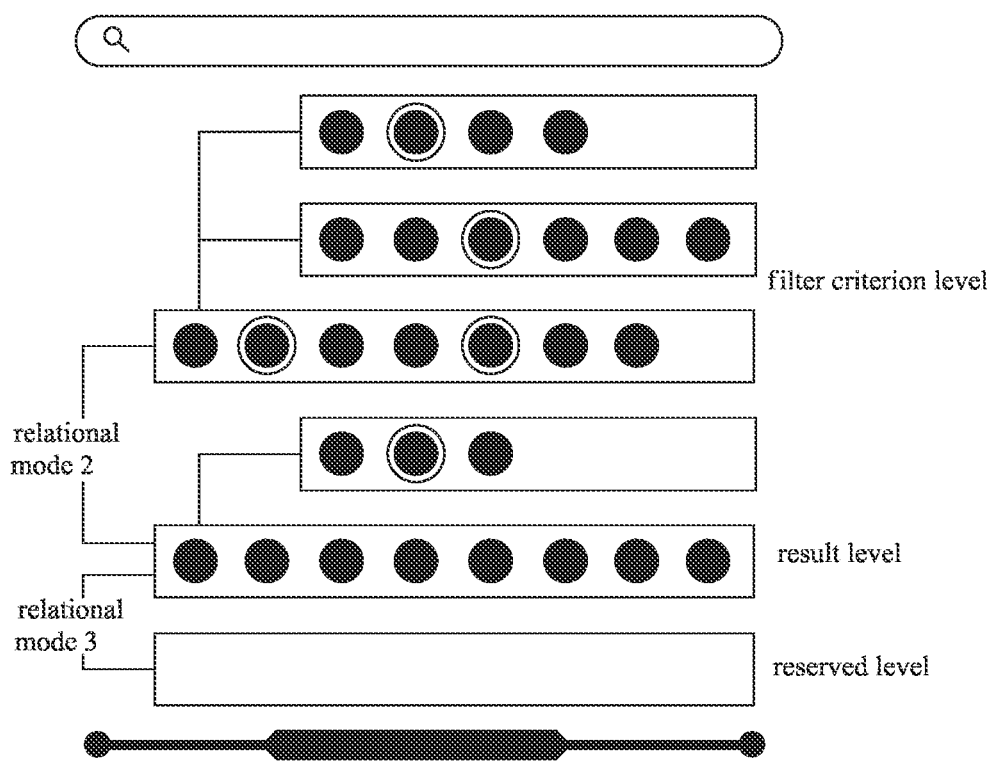
FIG. 9 is a schematic illustration showing formation of a retrieval interface according to the present invention.

The present invention implements a method for retrieval stored data of relational objects (see FIG. 9) while configuring a visualized retrieval interface. The method comprises the following steps:

(1) according to the present embodiment, providing the retrieval interface having a text search box, plural group display frames for receiving entered retrieval criteria and displaying retrieval results, and a time span limit bar such arranged that the text search box is at the top, below which are the group display frames arranged vertically from top to bottom, wherein a link existing between every two said group display frames represents a designated said relational mode; a higher said group display flame having some said objects selected to form the retrieval criteria, and a said lower group display frame displaying the retrieval results, and the time span limit bar is located below all the group display frames, wherein a time span limit bar is used as one of the retrieval criteria for defining a time interval and forms, together with every said retrieval criterion, an "and" relation to limit and filter the retrieval results;

in which if none of the group display frames has any said object selected, the group display fame at the top is a result level at default for showing the retrieval results, while all the other group display flames below are reserved levels with the objects therein inoperable; and when one or more said objects in the result level are selected, the result level is turned to a filter criterion level, and the group display frame immediately below it acts as a new result level, and so on; and in which the objects selected in the filter criterion level is subject to change anytime, and after the change the group display frame immediately below it acts as a new result level; and if after the change none of the objects in the group display frame is selected, this group display frame becomes a new result level, and all the other group display fames below the result level are reserved levels with the objects therein inoperable; and (2) configuring the retrieval interface so that the group display frame at every said level in the retrieval interface represents a particular said group, and includes the objects whose resident groups include the represented groups, in which upon creation of each said group display frame, a determination is made about which said group it represents according to the relational modes connected to it, and the objects in the group display frame displays required information in a custom manner. For example, the text object in a group display frame is directly displayed with its text contents, and the image object is directly displayed with its image contents, while the value object is displayed with the combination of its numeral contents and the text object corresponding to the unit. Other objects may be displayed as corresponding combinations of image objects and text objects. Under the image contents, text contents may be displayed. When a group having too many objects to be all displayed in a group display frame, the group display frame may display these objects in a scrollable manner so that all objects can be shown in response to a swiping operation.

(3) The group display flames at the plural levels can exchange their locations n, and the individual group display frames are deletable, in which deletion of one said group display frame causes deletion of the link connected thereto.

The method further comprises:

(4) at first accessing to the initial retrieval interface, providing the initial retrieval interface with plural said group display frames at plural said levels and the relational modes therebetween, or designating at least one said group display frame as an initial level;

clicking an edit button provided in a said group display frame at a said level to replace the group represented by the group display frame at the level by navigating all said groups having the objects in the group display frame at the level through the Class A unit, and selecting one said group that has not been represented by any previous said group display frame, or deselecting a said group that has not been represented by a said group display frame at a said level, wherein the groups used by the relational modes that have been linked cannot be deselected;

clicking one said group that has been represented by the group display frame at the level, searching through the Class B unit and displaying all the relational modes of the group, and selecting one of the relational modes to generate a group display him; and after the corresponding display frame is generated, if the selected group display frame already has a said group display frame below it, topping the selected group display frame at the level with a corresponding group display frame, and using this relational mode to form a said link; or, otherwise, generating, below the group display frame at the selected level, a group display frame that represents this relation as the corresponding group, and using this relational mode to form a said link; and adding one said link between the group display frames, by selecting two said group display frames needing to be linked, checking the relational modes between the groups represented by the two group display frames, selecting one of the relational modes, and linking the two group display frames using this relational mode.

(5) Changes made to the retrieval criteria can be performed at the same time as operations of the group display frames. The method thus further comprises: during retrieval performed through the group display frames, from all the selectable filter criteria displayed in the topmost group display Game, selecting one or more said objects, so that the objects having the relational modes with the selected objects through the links as filtered out through the Class C unit are displayed in the group display frame that is below and linked to the topmost group display frame, wherein multiple said levels of one said group display frame are connected by "and" relations, and for a said filter criterion level for which multiple said objects are selected, these objects selectively form the "and" or "or" relations when used to filter another said group display flame, when a said reserved level is used as a said filter criterion level for filtering, allowing the objects in the group display frame which it is upward linked to and is not a said filter criterion level to get filtered by this reserved level, in which the filter criteria are equivalent to that all of the objects in the reserved level are selected and form the "or" relations, and if then any said filtered group display frame still has any upward linked said group display frame, repeating this operation, and so on; and for each said soup display frame including the value/time objects, a display mode thereof is changed to a value span limit bar/the time span limit bar, in which among the objects included in the group display frame, the value-maximum/time-latest object is used as the maximum-value/latest-time point of the limit bar, and the value-maximum/time-latest object is used as the maximum-value/latest-time point of the limit bar, and when used as the filter criteria, between the two points there is a starting point and an ending point that are both movable, in which an "or" relation is formed among the objects between the starting point and the ending point for filter other said levels linked download.

In retrieval by text contents, text contents are entered to the text search field, so that the text contents become new filter criteria for the filter criterion level and the result level to filter the objects already existing therein, thereby filtering out the object that has the relational state with the text object in the Class C unit in which the related text object contains the text contents in the text search field. For example, if the text search field receives an input "Steve," the group display frame representing the performance displays objects like "Mr. and Mrs. Steve," and the group display frame representing the role displays objects like "Steven Rogers."

The method further comprises: f filtering the objects of the result level using the time span limit bar down at the retrieval interface, wherein the time span limit bar includes the starting times of all the event object related to the objects in the result level each along a timeline, so that after one said timeline represented by the time span limit bar is selected from the timelines corresponding to all the event objects, a time object having the earliest starting time of these events along this timeline acts as an earliest time point of the span bar, at the latest time acts as a latest time point of the span bar, between which two points there is a starting point and an ending point that are both movable;

wherein the links connecting to the result level are the relational states used when the objects in the result level are filtered, and wherein when there are an initiating event and an ending event in the Class C unit, and initiating and ending time objects of the events are on the timeline of this time span limit bar, any said relational state in which the initiating time point of the initiating event is after the terminating time point of the time span limit bar, or the initiating time point of the ending event is before the starting time point of the time span limit bar is not processed during filtering. The objects filtered using the relational state that the starting time point of the ending event is before the ending time point of the time span limit bar will be displayed in a special manner (such as shown in lower transparency).

The present invention provides a method for visualized display of retrieval results. The method dynamically displays objects in the result level through at least one display interface in a visualized manner. If the objects in the result level are suitable to be displayed through plural display interfaces, they can be switched among the suitable display interfaces. Clicking an object in the display interface leads to display of an attribute block and an event block that show the basic attributes of the object.

Figure 10:
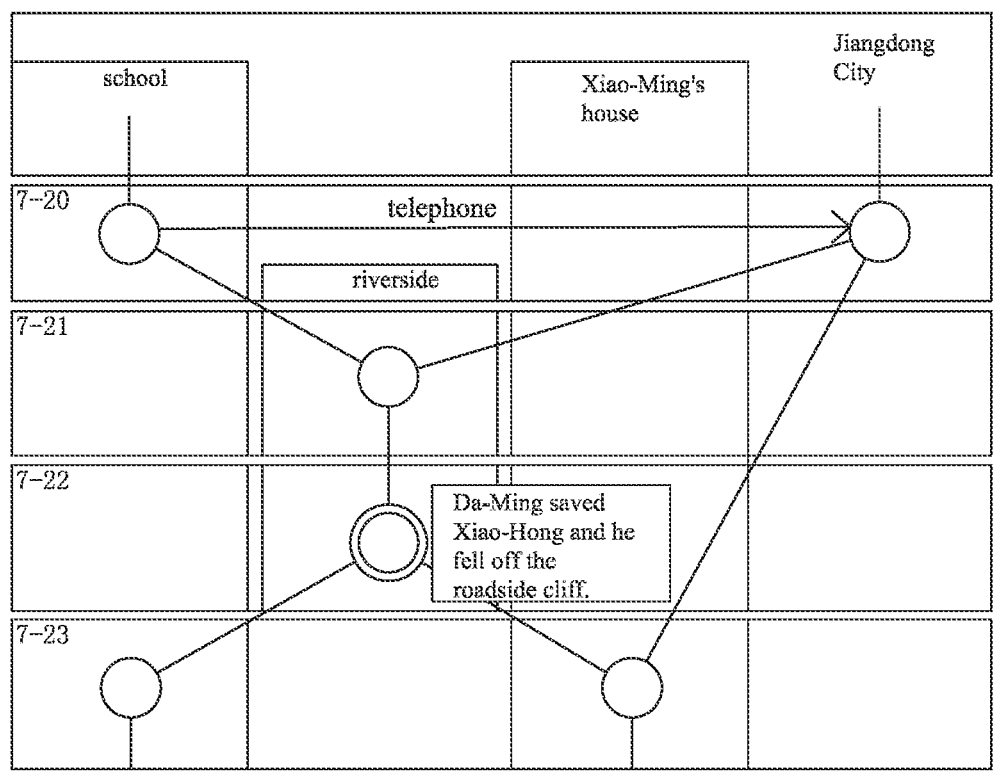
FIG. 10 is a schematic drawing of a display interface of the present invention.

FIG. 10 shows a display interface for displaying events, which is only used when the objects in the result level are said event objects, or when the objects in the result level have the time attribute in the Class B unit, and have the relational state of this time attribute in the Class C unit.

In the display interface, display is made in a form of an x-y-axis pair. The y axis is a timeline of these events, or a timeline along which this time attribute exists. The y axis has its height determined by the earliest time point and the latest time point in the times corresponding to the time attribute designated for the times/objects along this timeline corresponding to the objects in the result level. The display interface generates blocks representing these objects according to the objects related to the attribute designated for the objects in the result level. For sufficiently sizing each said block that it can carry the corresponding objects in the result level, the block has an event display area whose height in they axis is determined by the earliest time point and the latest time point in the times corresponding to the time attribute designated for the times/objects along this timeline corresponding to the events in the result level corresponding to this block, and whose width in an x axis is determined by a maximum number of the events happening simultaneously, such that different said blocks have their respective said areas not overlapping each other. When the objects represented by the blocks have superior-subordinate relational modes therebetween, and have relational states of the superior-subordinate relational modes, such displaying the blocks that a said block representing a superior wraps and is displayed below a said block representing a subordinate. For each said object in the result level, a location thereof in they axis according to the corresponding time object in a y-axis timeline is determined, and in which said block it is resident according to the object corresponding to the block is determined. If an object in the result level has plural corresponding said time objects or blocks, this object in the result level is allowed to be displayed repeatedly. The objects in the result level are linked flour top to bottom according to a said attribute of the objects in the result level, and two said superior and subordinate events in this attribute that are related to the same object are linked.

In the specification and the appended claims, the ordinal numbers like "first" and "second" are just descriptive to the elements following them and do not mean or imply their relative importance or signify their quantitative criteria Therefore, with features described by such ordinal numbers, it means or implies that at least one of the recited features exists. Unless stated otherwise, use of "a plurality of" or "plural" means two or more than two.

The description of any process or method as provided in a flowchart or in other means herein is intended to be understood as including one or more modules or their sections or parts that are capable of executing codes of instructions for implementing particular logical functions or steps of processes, and the scope of the preferred modes of the present invention shall include other implementations, wherein the orders shown or discussed herein are be followed or not, which means that, according to the involved functions, steps may be performed in basically the stated orders or in their reversed orders. All these should be understood by people skilled in the art to which the embodiments of the present invention pertain.

The logics and/or steps, for example, as shown or in other means herein, may be considered as a sequencing list of executable instructions for implementing logical functions, which can be realized in any computer-readable medium to be used by an instruction-executing systems, devices, or equipment (such as computer-based systems, processor-equipped systems, or other systems capable of taking instructions from instruction-executing systems, devices, or equipment and executing such instructions), or to be combined with these instruction-executing systems, devices, or equipment for use. In the specification, a "computer-readable medium" may be any device that comprises, stores, communicates, distributes, or transfers programs for instruction-executing systems, devices, or equipment to use or combined with these instruction-executing systems, devices, or equipment for use. A non-exhaustive list of more specific examples of such a computer-readable medium may include: electrical connection portion (electronic device) having one or more wirings, a portable computer drive (a magnetic device), a random-access memory (RAM), a read-only memory (ROM), an erasable programmable read-only memory (EPROM or a flash memory), an optical-fiber device, and a compact disc read-only memory (CDROM). In addition, the computer-readable medium may even be paper or another medium for the program to be printed thereon, so that through, for example, optically scanning the paper or the medium and then editing, interpreting, or otherwise processing as required, the program can be obtained electronically and stored in a computer memory.

It is to be appreciated that each part of the present invention may be realized using hardware, software, firmware, or a combination thereof. In the implementations as described above, plural steps or methods may be stored in a storage device and implemented by software or firmware executed by a suitable instruction-executing system.

It would be understandable to people with ordinary skill in the art that the methods as described in the embodiments above may each have all or some of its steps achieved by using a program to instruct related hardware components. The program may be stored in a computer-readable medium, which, when being executed, preforms one or a combination of the steps of the method as described in the embodiment.

Additionally, the functional units of any embodiment of the present invention may be integrated in a single processing module, or may alternatively exist as individual, physical units, or may have two or more than two units integrated in a module. The integrated module may be in the form of hardware, or may alternatively be a software functional module. Where the integrated module is implemented as a software functional module and sild or used as a standalone product, it may be stored in a computer-readable medium, which may be, for example, a read-only memory, a hard drive, or an optical disc.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A computer-implemented method for constructing a visualized retrieval interface using processor-equipped systems, based on a storage structure, the storage structure comprising:

a Class A unit for storing a plurality of objects to be processed, the plurality of objects divided into a plurality of groups comprising at least Group 1 and Group 2;

a Class B unit for storing relational modes of the plurality of objects;

a Class C unit for storing specific relational states between the plurality of objects of the Class A unit; and an auxiliary unit, wherein in the Class A unit, objects that have similar available relational modes are classified into one group, the plurality of objects including ordinary objects and event objects, each object of the plurality of objects in the Class A unit recording a unique ID and a resident group and each one of the plurality of objects further recording relevant data required, wherein in the Class B unit, each object of the plurality of objects has an attribute formed from a relational mode between the object and another object, in which adding one relational mode endows objects in Group 1 and objects in Group 2 each with the attribute, and each one of the objects in the same group share the endowed attribute, the Class B unit recording a plurality of relational modes between every two groups, every relational mode of the plurality of relational modes recording a relational mode ID, Group 1 ID, Group 2

ID, a text object corresponding to a title with which the objects in Group 1 call the objects in Group 2 under the relational mode, a text object corresponding to a title with which the objects in Group 2 call the objects in Group 1 under the relational mode, a superior relational mode superior to the relational mode, and a type of the relational mode, wherein the Class C unit records a plurality of relational states between every two objects of the Class A unit, a relational state recording a relational state ID, the relational mode between Object 1 and Object 2, and an event object of an initiating event and an event object of an ending event, in which the initiating and ending event objects determine an interval of existence of the relational state along timelines corresponding to the event objects of the initiating event and the ending event, the auxiliary unit configured to ensure data integrity in the Class A, B, and C units, and storing information of internal relations, wherein event objects that have similar available relational modes are classified into one group, data corresponding to each event object including an object ID, a resident group, a starting time and an ending time, wherein in the Class B unit types of the relational modes include:
  A. ordinary relations: referring to general, irreversible relations, and referring to the relational modes of the groups in which the objects in Group 1 and the objects in Group 2 are stored,
  B. intra-group relations: being reversible relations, and to relations between the objects in the same group, wherein the groups in which the objects in Group 1 and the objects in Group 2 are stored are identical, and
  C. superior-subordinate relations: being special reversible relations, in which the groups in which the objects in Group 1 and the objects in Group 2 are stored are identical, and the objects in the same group form including and included relations, wherein the information of the internal relations refers to the relational states by records of the internal relations when one relational state involves three or more objects, in which when one relational state involves three objects, one internal relation is required to record three relational states in the one internal relation, and when the one relational state involves n objects, $$\frac{(n-1)(n-2)}{2}$$

internal relations are required to record $$\frac{(n-1)n}{2}$$

relational states in the one relational state,
the method comprising steps of:
  (1) providing a plurality of group display frames arranged vertically from top to bottom for receiving inputs of a retrieval criteria and for displaying retrieval results, wherein a link existing between every two said group display frames represents a designated relational mode selected from the relational modes stored in Class B unit, a higher group display frame with objects selected, from the plurality of objects of Class A unit, to form the retrieval criteria, and a lower group display frame displaying the retrieval results, wherein a time span limit bar used as one of the retrieval criteria for defining a time interval and forms, together with every retrieval criterion, an "and" relation to limit and filter the retrieval results,
    in which in a scenario where none of the group display frames has any object selected, the group display frame at the top is a result level at default for showing the retrieval results, while each one of the other group display frames below are reserved levels with the objects, selected from the plurality of objects stored in Class A unit, in each one of the other group display frames inoperable, and
    when one or more objects in the result level are selected from the plurality of objects in Class A unit, the result level is turned to a filter criterion level, and the group display frame immediately below the result level acts as a new result level,
    in which the objects selected, from the plurality of objects in Class A unit, in the filter criterion level are subject to change anytime and after the change the display frame immediately below the filter criterion level acts as a new result level; and
    in a scenario where after the change none of the objects in the group display is selected from the plurality of objects in Class A unit, the group display becomes a new result level, and each one of the other group display frames below the result level are reserved levels with the objects in each one of the other group display frames inoperable; and
  (2) configuring the retrieval interface in a manner that the group display frame at every said level in the retrieval interface represents a particular group selected from the plurality of groups into which the plurality of objects of the Class A unit have been divided, and includes objects with resident groups including the represented groups, in which upon creation of each group display frame, a determination is made about which group, of the plurality of groups of Class A unit, the created display frame represents according to the relational modes, selected from the relational modes of Class B unit, connected to the created display frames, and the objects, selected from the plurality of objects in Class A unit, in the display frame displays required information in a custom manner.

2. The computer-implemented method of claim 1, further comprising:
  at first accessing the initial retrieval interface, providing the initial retrieval interface with a plurality of group display frames at a plurality of levels and the relational modes, selected from the relational modes of Class B unit, between the plurality of group display frames, or designating at least one group display frame as an initial level;
  clicking edit button provided in a group display frame at a level to replace the group, selected from the plurality of groups in Class A unit, represented by the group display frame at the level by navigating each one of groups, selected from the plurality of groups in Class A unit, having the objects in the group display frame at the level through the Class A unit, and selecting one group, from the plurality of groups in Class A unit, that has not been represented by any previous group display frame, or deselecting a group, from the plurality of groups in Class A unit, that has not been represented by a group display frame at the level, wherein the groups, selected from the plurality of groups in Class A unit, used by the relational modes, selected from the relational modes of Class B unit, that have been linked are configured to not be deselected;

clicking one group, selected from the plurality of groups in Class A unit, that has been represented by the group display frame at the level, searching through the Class B unit and displaying each one of the relational modes of the group, and selecting one of the relational modes to generate a group display frame; and after the corresponding display frame is generated, in a scenario where the selected group display frame already has a group display frame below the selected group display frame, topping the selected group display frame at the level with a corresponding group display frame, and using the relational mode to form a link; or, otherwise, generating, below the group display frame at the selected level, a display frame that represents the relational mode as the corresponding group, and using the relational mode to form a link; and adding one link between the group display frames by selecting two group display frames needing to be linked, checking the relational modes between the groups represented by the two group display frames, selecting one of the relational modes and linking the two group display frames using this relational mode.

3. The computer-implemented method of claim 2, wherein the group display frames at the plurality of levels are capable of exchanging locations across the plurality of levels, and the individual group display frames are deletable.

4. The computer-implemented method of claim 1, further comprising implementing retrieval based on the visualized retrieval interface constructed, wherein implementing retrieval based on the visualized retrieval interface further comprises:

selecting the objects, from the plurality of objects in Class A unit, of the group display frame at the filter criterion level in the visualized retrieval interface or entering text contents into a text search field, and a dragging a time span limit bar to set a starting time point and a terminating time point.

5. The computer-implemented method of claim 4, further comprising steps of:

(1) during retrieval performed through the group display frames, from each one of the selectable filter criteria displayed in the topmost group display frame, selecting one or more objects from the plurality of objects in Class A unit, to ensure that the objects having the relational modes with the selected objects through the links as filtered out through the Class C unit are displayed in the group display frame that is below and linked to the topmost group display frame, wherein multiple levels of one group display frame are connected by "and" relations, and for a filter criterion level for which multiple objects are selected, the selected multiple objects selectively form the "and" or "or" relations when used to filter another group display frame, when a reserved level is used as a filter criterion level for filtering, allowing the objects in the group display frame which the group display frame is upward linked to and is not a filter criterion level to get filtered by the reserved level in which the filter criteria are equivalent to that each one of the objects in the reserved level are selected and form the "or" relations, and in a scenario when any said filtered group display frame still has any upward linked display frame, repeating this operation; and (2) filtering the objects, selected from the plurality of objects in Class A unit, of the result level using the time span limit bar down at the retrieval interface, wherein the time span limit bar includes the starting times of each one of the event object related to the objects in the result level each along a timeline, to ensure that after one timeline represented by the time span limit bar is selected from the timelines corresponding to each one of the event objects, selected from Class C unit, a time object having the earliest starting time of these events along this timeline acts as an earliest time point of the span bar, at the latest time acts as a latest time point of the span bar, between which two points there is a starting point and an ending point that are both movable:

wherein the links connecting to the result level are the relational states used when the objects in the result level are filtered, and wherein when there are an initiating event and an ending event in the Class C unit and initiating and ending times of the events are on the timeline of the time span limit bar, any relational state in which the initiating time point of the initiating event is after the terminating time point of the time span limit bar, or the initiating time point of the ending event is before the starting time point the time span limit bar is not processed during filtering; and only the relational states in which the initiating time point of the ending event is before the terminating time point of the time span limit bar are processed.

6. The computer-implemented method of claim 5, wherein:

where the plurality of objects in the Class A unit further include:

text objects: forming only one group, and data corresponding to each text object including an object ID, one and only one resident group, and text contents; retrieval conducted using the text contents by inputting the text contents to the text search field.

7. The computer-implemented method of claim 5, wherein:

where the plurality of objects in the Class A unit further include:

time objects: forming a plurality of groups, in which the time objects of the same timeline are classified into the same group, and data corresponding to each time object including: an object ID, one and only one resident group, and a serial number used for sorting along the same timeline;

value objects: forming a plurality of groups, in which the value objects of the same measurement are classified into the same group, and data corresponding to each value object including an object ID, one and only one resident group, numeral contents and a unit;

for each group display frame including the value or time objects, a display mode of the each group display frame is changed to a value span limit bar or a time span limit bar, in which among the objects included in the group display frame, the value-maximum or time-latest object is used as a maximum value or a latest time point of the limit bar, and the value maximum or the time latest object is used as the maximum value or the latest time point of the limit bar; and when used as the filter criteria, between the two points there is a starting point and an ending point that are both movable, in which an "or" relation is formed among the objects between the starting point and the ending point to filter other levels linked download.

8. The computer-implemented method of claim 4, further comprising visualized display of the retrieval results obtained, the visualized display of the retrieval results obtained further comprising:

dynamically displaying the objects in the result level through at least one display interface in a visualized manner, in which in a scenario where the objects, selected from the plurality of objects in Class A unit, in the result level are suitable to be displayed through a plurality of display interfaces, the objects in the result level are capable of being switched among the suitable display interfaces.

9. The computer-implemented method of claim 8, further comprising:

providing a display interface for displaying events, which is only used when the objects in the result level are event objects, or when the objects in the result level have the time attribute in the Class B unit, and have the relational state of the time attribute in the Class C unit, and makes display in a form x-y pair, wherein a y axis is a timeline of the events, or a timeline along which the time attribute exists, and the y axis has height determined by the earliest time point and the latest time point in the times corresponding to the time attribute designated for the times or the objects along the timeline corresponding to the objects in the result level;

the display interface generating blocks representing the objects according to the objects related to the attribute designated for the objects in the result level, wherein for sufficiently sizing each block that the block is capable of carrying the corresponding objects in the result level, the block has an event display area with height in the y axis determined by the earliest time point and the latest time point in the times corresponding to the time attribute designated for the times or the objects along the timeline corresponding to the events in the result level corresponding to the block, and width of the block in an x axis is determined by a maximum number of the events happening simultaneously to ensure that different blocks have their respective areas not overlapping each other;

when the objects represented by the blocks have superior-subordinate relational modes between the blocks, and have relational states of the superior-subordinate relational modes, such displaying the blocks that a block representing a superior wraps and is displayed below a block representing a subordinate; each object in the result level, determining location of the each block in the y axis according to the corresponding time object in a Y-axis timeline, and determining in which block representing the superior, the block representing the subordinate is resident according to the object corresponding to the block, in a scenario where an object in the result level has a plurality of corresponding time objects or blocks, allowing the object in the result level to be displayed repeatedly;

linking the objects in the result level from top to bottom according to an attribute of the objects in the result level, and linking two superior and subordinate events in the attribute that are related to the same object.

* * * * *